(12) United States Patent
Blasch (10) Patent No.: US 12,320,272 B2
(45) Date of Patent: Jun. 3, 2025

(54) TURBINE ENGINE HAVING A COMPOSITE ASSEMBLY

(71) Applicant: GENERAL ELECTRIC COMPANY, Schenectady, NY (US)

(72) Inventor: Lawrence Robert Blasch, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/314,401

(22) Filed: May 9, 2023

(65) Prior Publication Data

US 2024/0376827 A1 Nov. 14, 2024

(51) Int. Cl.
*F01D 5/28* (2006.01)
*F02C 7/00* (2006.01)

(52) U.S. Cl.
CPC ............ *F01D 5/282* (2013.01); *F02C 7/00* (2013.01); *F05D 2230/60* (2013.01); *F05D 2300/603* (2013.01)

(58) Field of Classification Search
CPC ............ F01D 5/282; F05D 2300/603–6033
See application file for complete search history.

(56) References Cited

U.S. PATENT DOCUMENTS

| 5,046,147 | A  | * | 9/1991  | Funahashi | G01T 1/2014 |
| | | | | | 250/587 |
| 5,841,892 | A  |   | 11/1998 | McGrath et al. | |
| 6,484,539 | B1 | * | 11/2002 | Nordine | C03C 13/006 |
| | | | | | 501/36 |
| 7,889,907 | B2 |   | 2/2011  | Engelbart et al. | |
| 8,442,301 | B2 |   | 5/2013  | Dragovich et al. | |
| 8,928,316 | B2 |   | 1/2015  | Goldfine et al. | |
| 8,965,100 | B2 |   | 2/2015  | Lin et al. | |
| 9,152,744 | B2 |   | 10/2015 | Grellou et al. | |
| 9,336,588 | B2 |   | 5/2016  | Crothers et al. | |
| 9,358,486 | B2 |   | 6/2016  | McLeod et al. | |
| 9,850,173 | B2 | * | 12/2017 | Keith | B32B 5/02 |
| 10,668,673 | B2 |  | 6/2020  | Maass | |
| 2011/0204330 | A1 | * | 8/2011 | LeMieux | H01L 29/0673 |
| | | | | | 977/750 |
| 2014/0271161 | A1 | * | 9/2014 | Lazur | C04B 35/62868 |
| | | | | | 428/221 |
| 2016/0203594 | A1 | * | 7/2016 | Morard | G06T 7/40 |
| | | | | | 382/152 |
| 2016/0361950 | A1 |   | 12/2016 | Shaughnessy | |
| 2019/0084890 | A1 | * | 3/2019  | Weaver | F01D 5/284 |
| 2022/0071490 | A1 | * | 3/2022  | Vaughan, Jr. | G01R 33/5602 |
| 2022/0297391 | A1 |   | 9/2022  | Coupe | |
| 2023/0054031 | A1 | * | 2/2023  | Halliday | F16C 3/026 |
| 2023/0401786 | A1 | * | 12/2023 | Pietrow | G06T 17/00 |

FOREIGN PATENT DOCUMENTS

EP 2572871 A2 3/2013

* cited by examiner

*Primary Examiner* — Andrew H Nguyen
(74) *Attorney, Agent, or Firm* — McGarry Bair PC (57) ABSTRACT

A turbine engine including a fan section, a compressor section, a combustion section, and a turbine section in serial flow arrangement. The turbine engine further having a composite assembly provided within at least one of the fan section, the compressor section, the combustion section or the turbine section. The composite assembly including a set of stacked composite plies, with each ply of the set of stacked composite plies being made from a plurality of fibers.

17 Claims, 3 Drawing Sheets

TURBINE ENGINE HAVING A COMPOSITE ASSEMBLY

TECHNICAL FIELD

The disclosure generally relates to a turbine engine, and more specifically to a turbine engine including a composite assembly with a plurality of fibers.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

Some components of the turbine engine can include composite materials. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine.

During manufacture of the turbine engine, the portions made of composite material may be examined to ensure that the composite materials are formed as intended. In order to determine whether or not the composite materials are formed as intended, the portion made of composite material must be cut apart and visually inspected, which ultimately destroys the composite assembly. Upon an inspection of the cut apart part, the process used to create the composite assembly is documented When a composite assembly is found to be conforming to a design intent of the composite assembly, the documented process is followed to produce additional composite assemblies which are assumed to conform to the design intent.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a turbine engine including a composite assembly. As used herein, a composite assembly is any suitable object or combination of objects that is made of a composite material. The composite assembly can include a set of stacked composite plies, each including a plurality of fiber bundles. At least a portion of the fiber bundles of the plurality of fiber bundles can include a first subset of fibers and a second subset of fibers.

The composite assembly can be imaged through non-destructive evaluation. The composite assembly can be imaged directly after manufacture through non-destructive evaluation. The composite assembly can be imaged later in the lifespan and after use of the composite assembly through non-destructive evaluation. As used herein, non-destructive evaluation can include any device that allows for the imaging of an internal structure of the composite assembly without having to cut or tear apart the composite assembly. Non-limiting examples of non-destructive evaluation include, but are not limited to, magnetic resonance imaging, X-ray imaging, ultrasound imaging, or acoustic imaging. For purposes of illustration, the present disclosure will be described with respect to a composite assembly for a turbine engine. It will be understood, however, that aspects of the disclosure described herein are not so limited and can have general applicability within other engines or within other portions of the turbine engine. For example, the disclosure can have applicability for a composite airfoil in other engines or vehicles, and can be used to provide benefits in industrial, commercial, and residential applications. It will be further understood, however, that aspects of the disclosure described herein are not so limited to a turbine engine or other engine and can have general applicability within any suitable composite assembly.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked composite plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

Figure 1:
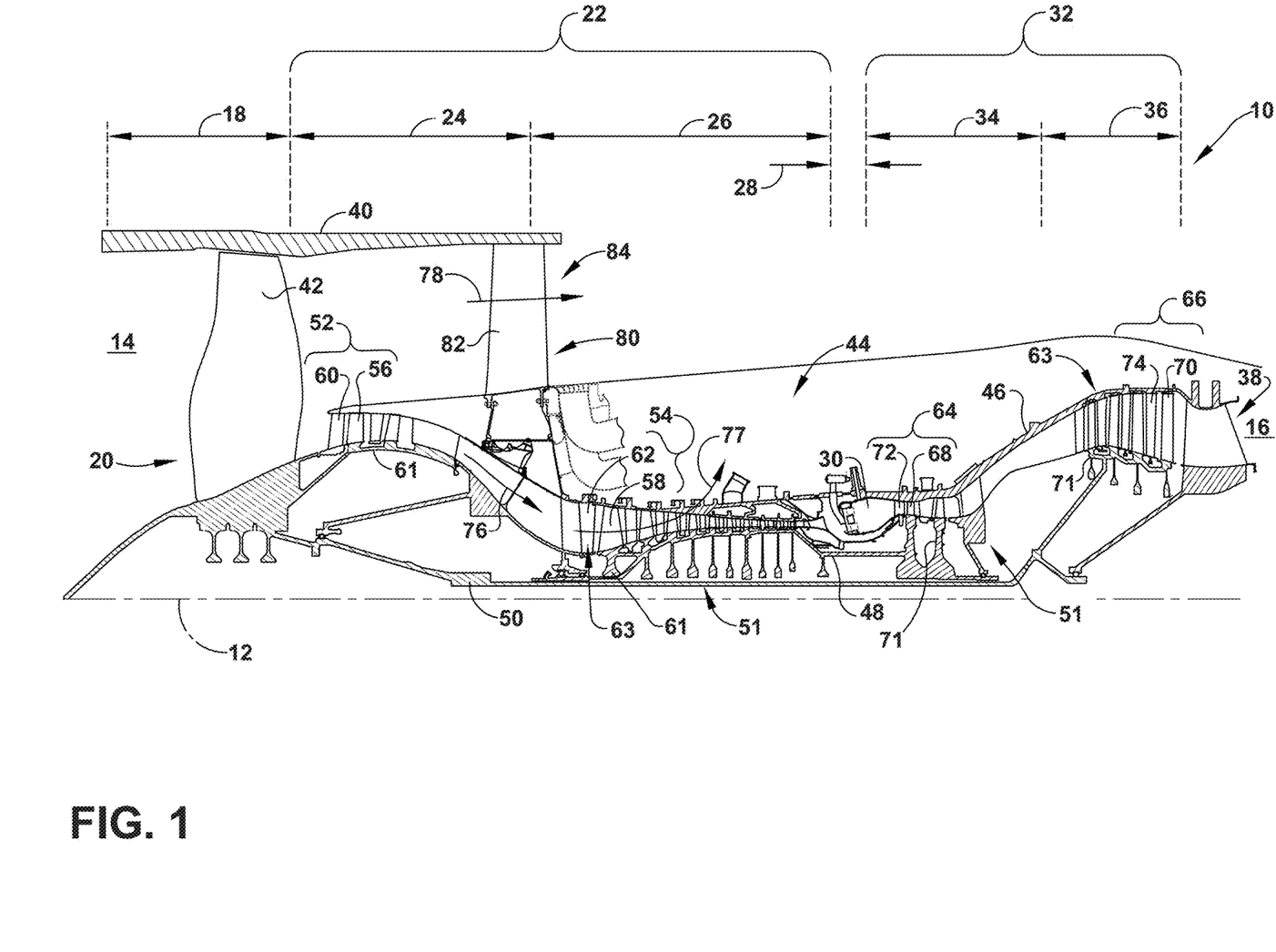
FIG. 1 is a schematic cross-sectional view of a turbine engine in accordance with an exemplary embodiment of the present disclosure.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor. The bleed air 77 can also be utilized by other systems.

A remaining portion of the airflow, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
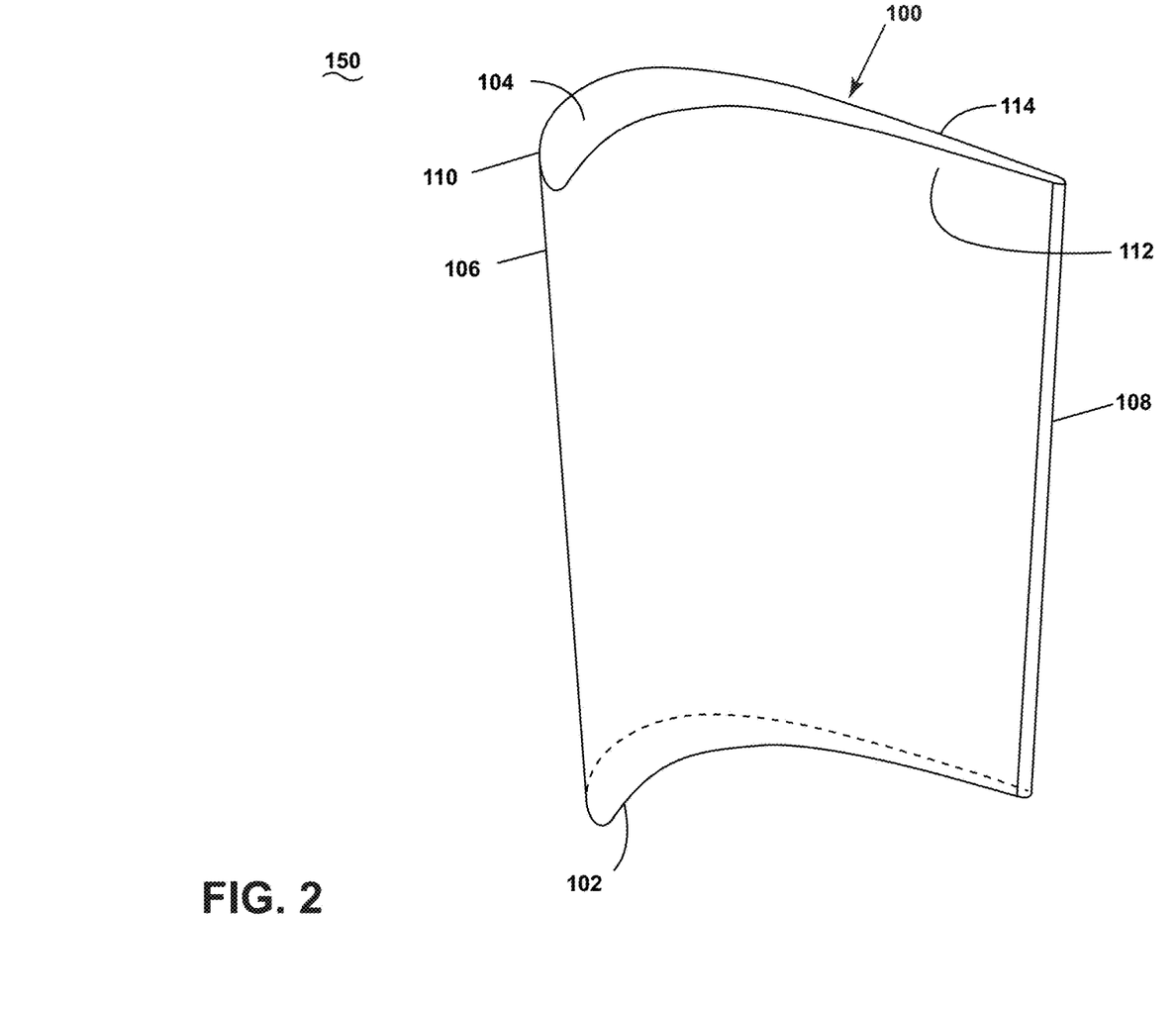
FIG. 2 is a perspective view of a composite assembly suitable for use within the turbine engine of FIG. 1, the composite airfoil including an outer wall defining a suction side and a pressure side.

FIG. 2 is a perspective view of a composite assembly 150 suitable for use within the turbine engine 10 of FIG. 1. As a non-liming example, the composite assembly 150 can be an airfoil 100 that can be used within the turbine engine 10 of FIG. 1. The airfoil 100 can be any suitable airfoil as described herein. As a non-limiting example, the airfoil can be a blade of the plurality of fan blades 42, the airfoil guide vane 82 (e.g., the set of stationary fan vanes), the static compressor vanes 60, 62, the rotating compressor blades 56, 58, the rotating turbine blades 68, 70, or the static turbine vanes 72, 74. The airfoil 100, however, will be described in terms of a vane that can be used in the fan section 18 or the compressor section 22. It will be appreciated that the composite assembly 150 can be any suitable assembly including a composite material such as, but not limited to, a heat exchanger, a wall, a liner, or any combination thereof.

The airfoil 100 can include an outer wall 110. The outer wall 110 can extend between a root 102 and a tip 104, and between a leading edge 106 and a trailing edge 108. The outer wall 110 can define a pressure side 112 and an opposing suction side 114 of the airfoil 100.

At least a portion of the airfoil 100 is made of a composite material. As a non-limiting example, the outer wall 110 can be formed as a composite skin.

Figure 3:
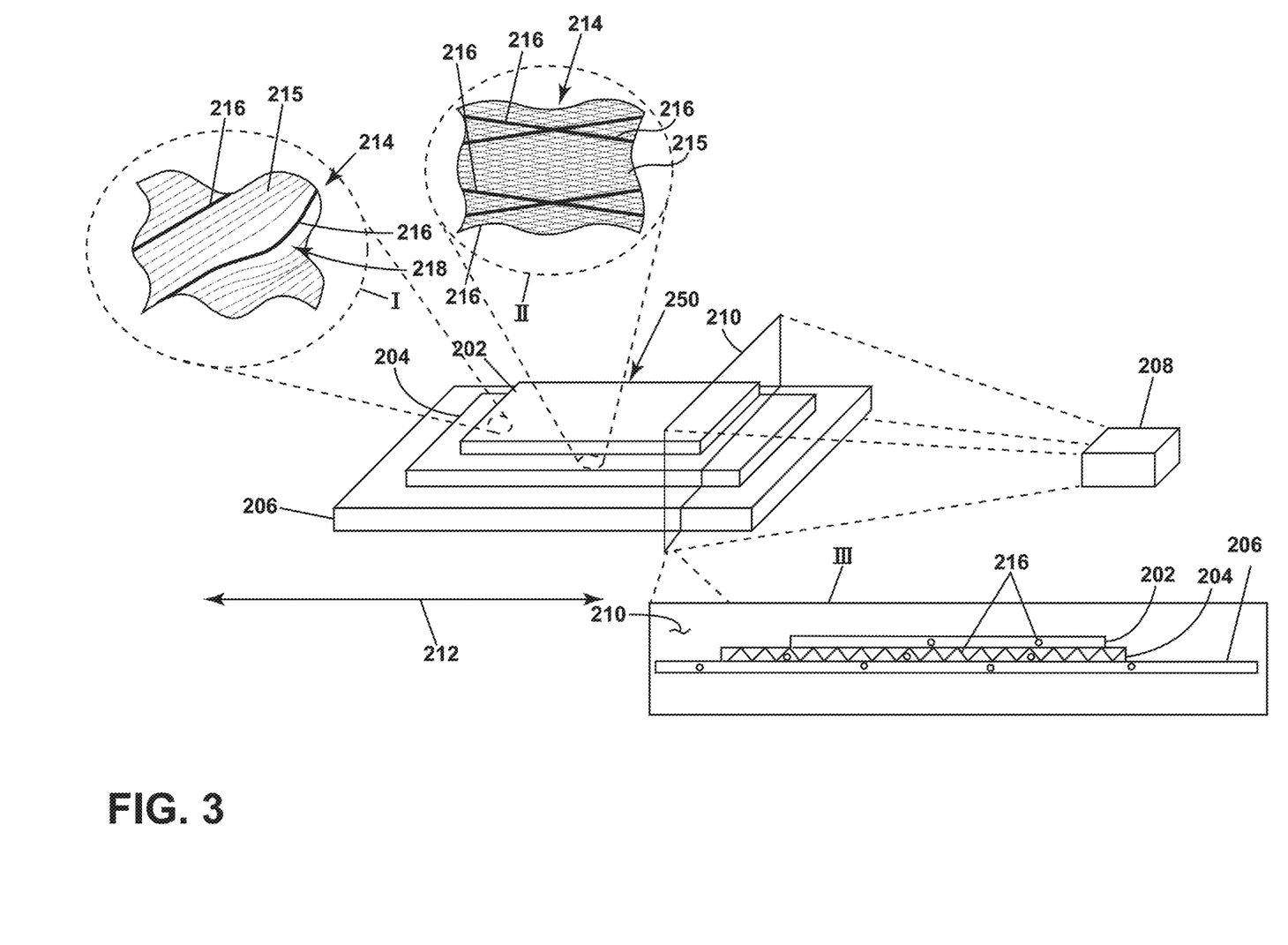
FIG. 3 is a schematic perspective view of a section of an exemplary composite assembly suitable for use within the turbine engine of FIG. 1, further having a fiber bundle that includes a subset of fibers being permanently visible through non-destructive evaluation.

FIG. 3 is a schematic perspective view of a section of an exemplary composite assembly 250 suitable for use within the turbine engine 10 of FIG. 1. The composite assembly 250 includes a set of stacked composite plies. As a non-limiting example, the composite assembly 250 includes a first composite ply 202, a second composite ply 204, and a third composite ply 206 stacked on top of one another.

Each of the first composite ply 202, the second composite ply 204 and the third composite ply 206 can be formed by a respective plurality of fibers 214. The plurality of fibers 214 can, together, form a composite structure of the respective ply that they make up. As used herein, the composite structure refers to the formation of the composite material including, but not limited to, the orientation (e.g., unidirectional, woven, braided, etc.) of the plurality of fibers 214.

The composite structure can be the same or different between the set of stacked composite plies. As a non-liming example, the plurality of fibers 214 forming the first composite ply 202 can be unidirectional as illustrated in enlarged area I. As a non-limiting example, the plurality of fibers 214 forming the second composite ply 204 can be bidirectional such that the plurality of fibers 214 are woven or braided together as illustrated in enlarged area II. Each plurality of fibers 214 can be made of a single fiber or a combination of fibers. In case of the latter, the plurality of fibers 214 can be referred to as a bundle of fibers. As a non-limiting example, the plurality of fibers 214 can include multiple fibers that are separately grouped from another. As such, the plurality of fibers 214 can form a plurality of fiber bundles.

Each plurality of fibers 214 can include a first subset of fibers 215 and a second subset of fibers 216. The first subset of fibers 215 and the second subset of fibers 216 can each include a single fiber, a bundle of fibers or a plurality of fiber bundles. For illustrative purposes, the second subset of fibers 216 is illustrated as being thicker than the first subset of fibers 215. It will be appreciated, however, that the first subset of fibers 215 and the second subset of fibers 216 can be the same or differing thicknesses.

There can be a larger total number of the first subset of fibers 215 with respect to the second sat of fibers 216. As a non-limiting example, the second subset of fibers 216 can be greater than 0% and less than or equal to 5% of the total number of fibers in the plurality of fibers 214.

The first subset of fibers 215 can be made of the same or different material as the second subset of fibers 216. The first subset of fibers 215 is differentiated from the second set of fibers 216 by at least one material property. When the second subset of fibers 216 is a bundle of fibers, it is contemplated that a majority of the second subset of fibers 216 can have the same material properties as the first subset of fibers 215 while a small portion of the fibers of each of the second subset of fibers 216 has a differing material property. As a non-limiting example, greater than 0% and less than or equal to 5% of the second subset of fibers 216 can have a differing material property with respect to, at least, the first subset of fibers 215. It is contemplated that the total number of fibers of the plurality of fibers 214 with a differing material property can be small enough such that they do not negatively affect the overall material properties of the respective composite ply.

The at least one material property can be a density or a conductivity. The at least one material property can be created by forming at least a portion of the second subset of fibers 216 differently with respect to the first subset of fibers 215 (e.g., by clumping the second set of fibers 216 closer to one another), forming at least a portion of the second subset of fibers 216 with a differing material with respect to the first subset of fibers 215, or by providing a dopant to at least a portion of the second subset of fibers 216. As a non-limiting example, the dopant can be a non-dissipating dopant such that the second subset of fibers 216 always includes the differing material property. As a non-limiting example, the dopant can be, but is not limited to, an oxide dopant. As a non-limiting example, the oxide dopant can be a graphene oxide dopant.

The differentiation in the at least one material property between the first subset of fibers 215 and the second subset of fibers 216 can ensure that the first subset of fibers 215 is non-visible through non-destructive evaluation while the second subset of fibers 216 is visible through non-destructive evaluation. In the case of the second subset of fibers 216 being a bundle of fibers, only the fibers with the differing material property are visible through non-destructive evaluation while the remaining fibers are non-visible through non-destructive evaluation. In either case, the second subset of fibers 216 is said to be visible through non-destructive evaluation.

As a non-limiting example, non-destructive evaluation can be done through acoustic imaging, ultrasound, X-rays, computer tomography (CT), or magnetic resonance (MRI). The at least one material property can ensure that the respective fiber of the plurality of fibers 214 is either visible or non-visible through the non-destructive evaluation. As a non-limiting example, the density of at least a portion of the second subset of fibers 216 can be larger than the conductivity of the first subset of fibers 215 such that the second subset of fibers 216 is visible through an X-ray or ultrasound scan, while the first subset of fibers 215 is non-visible through the X-ray or ultrasound scans. As a non-limiting example, the conductivity of at least a portion of the second subset of fibers 216 can be larger than the density of the first subset of fibers 215 such that the second subset of fibers 216 is visible through a magnetic resonance scan, while the first subset of fibers 215 is non-visible through the magnetic resonance scan.

After manufacture of the composite assembly 250, a non-destructive imager 208 can be used to produce an image of the composite assembly 250 illustrating the composite structure of each ply of the set of stacked composite plies of the composite assembly 250. The non-destructive imager 208 can take an image along a plane 210. The plane 210 can be transverse a thickness of each ply of the set of stacked composite plies. The non-destructive imager 208 can take a plurality of images along the plane 210 at varying distances from the non-destructive imager 208 or otherwise at varying depths within the composite assembly 250. As a non-limiting example, the plane 210 can move along the composite assembly 250 in the direction indicated by arrow 212.

An exemplary image taken by the non-destructive imager 208 is illustrated in enlarged section III. As illustrated, the first subset of fibers 215 that form the first composite ply 202, the second composite ply 204, and the third composite ply 206 are not visible. However, the second subset of fibers 216 that form the first composite ply 202, the second composite ply 204, and the third composite ply 206 are visible due to the differing material property.

A 3D image of the composite assembly 250 can then be generated utilizing the plurality of images taken by the non-destructive imager 208 at varying depths within the composite assembly 250. With the 3D image, it is possible to view the composite structure in more detail as illustrated in enlarged sections I and II.

This imaging technique can be used to produce an accurate formation of the composite structure of each portion of the composite assembly 250. This imaging technique can be used to ensure that the composite assembly 250 was formed or is still formed as intended. This imaging technique can be used to determine if there are any deformities within the composite assembly 250. As a non-limiting example, the first composite ply 202 can include a deformity in the form of an inclusion 218. The inclusion 218 causes at least a portion of the plurality of fibers 214 forming the first composite ply 202 to deform outward from a center of the inclusion 218 and not be in-line (parallel to) a remaining portion of the fibers of the plurality of fibers 214. The inclusion 218 can cause at least one of the second subset of fibers 216 to deform outward such that the inclusion 218 is visible through non-destructive evaluation. The total number of the second subset of fibers 216 and the distance between each of the second subset of fibers 214 can be selected such that deformities over a certain tolerance will always be detected through non-destructive evaluation.

While described in terms of the inclusion 218, it will be appreciated that the non-destructive evaluation can be used to detect any deformity in the composite structure that would negatively affect the strength of the composite structure, form during manufacture, or form over time during use of the composite assembly 250. As a non-limiting example, the deformity can include, but is not limited to, the inclusion 218, ply bunching, filler-rich ply gaps, a deviation from the intended composite structure, or any combination thereof.

The imaging techniques discussed herein can be used during manufacture or maintenance to form a 3D image of the composite structure. As a non-limiting example, the imaging techniques can be used during manufacture to determine if the composite assembly 250 being manufactured has any deformities. As a non-limiting example, the imaging techniques can be used during maintenance of the composite assembly 250 to determine if the composite assembly 250 has developed any deformities during use or over the lifetime of the composite assembly 250.

The imaging techniques discussed herein can be used for documentation purposes gathered during or after manufacture of the composite assembly 250 and used later in the lifetime of the composite assembly 250 such as during maintenance. During, or directly after manufacture of the composite assembly 250, the 3D image can be created. This 3D image can define a baseline or a fingerprint for the specific composite assembly 250 that is imaged. It is contemplated that a plurality of composite assemblies can be imaged, with each one potentially having minor differences in at least one aspect (e.g., weave pattern, number of fibers, etc.). As such, each the 3D image of each composite assembly 250 can define a unique fingerprint for each composite assembly 250. These unique fingerprints can be saved for future reference, such that during, for example, maintenance of the composite assembly 250, the unique fingerprint of the composite assembly 250 can be compared to a 3D image of the composite assembly 250 currently to see how/if the composite assembly 250 has changed over the lifetime of the composite assembly 250. This can be useful for future maintenance or future production. As a non-limiting example, the comparison between the unique fingerprint taken during or just after manufacture with the current 3D image of the composite assembly 250 can determine how the composite assembly 250 will change over time. This information can ultimately be used to help in designing future composite assemblies 250 to address potentiation issues with the composite assembly 250 that only occur over the lifetime and through normal use of the composite assembly 250.

Benefits associated with the present disclosure include a decreased burden of manufacture of the composite assembly when compared to a conventional manufacturing method of the composite assembly. For example, conventional manufacturing methods can rely on tearing and cutting apart every n number of composite assemblies produced on the assembly line to determine whether or not the composite structure is formed as intended. This, in turn, results in every n number of parts being destroyed. The composite assembly, as described herein, however, avoids this problem as the composite assembly includes the second subset of fibers that are visible through non-destructive evaluation. As such, the composite assembly can be imaged to determine the composite structure without having to destroy the composite assembly. Further, the construction of the composite assembly allows for every composite assembly on the assembly line to be imaged. This, in turn, means that a 3D image of each composite assembly can be generated and documented and thus the presence or non-presence of deformities in each composite assembly can be established. Further, the unique fingerprint can be created for each composite assembly, which can be used to differentiate individual composite assemblies. On the other hand, the conventional manufacturing method relies on cutting open every n part and not every part. As such, an assumption has to be made that the other composite assemblies that are not cut apart do not have deformities.

Benefits associated with the present disclosure include a decreased burden of maintenance and an increased lifespan of the composite assembly when compared to a conventional composite assembly. For example, the composite assembly of the conventional composite assembly is non-visible through non-destructive evaluation after manufacture of the conventional composite assembly. To determine the structure, the conventional composite assembly must be cut apart. The composite assembly, as described herein, however, includes the second subset of fibers including the differing material property that does not dissipate over time. As such, a 3D image of the composite structure can always be generated from manufacture to the end of the life cycle of the composite assembly without having to destroy the composite assembly. Further, the composite assembly as described herein increases the efficiency of maintenance and future manufacture. Specifically, the unique fingerprint created during or directly after manufacture can be compared with the composite assembly after the composite assembly has been used to determine how the composite assembly has changed over time. This comparison can be used to streamline the maintenance process by determining what exactly has changed with the composite assembly and further provide information as to how the composite assembly will change over time, which can ultimately help in the designing of a new composite assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a fan section, a compressor section, a combustion section, and a turbine section in serial flow arrangement, and a composite assembly provided within at least one of the fan section, the compressor section, the combustion section or the turbine section, the composite assembly having a set of stacked composite plies, each composite ply of the set of stacked composite plies comprising a plurality of fibers having a first subset of fibers being non-visible through non-destructive evaluation and a second subset of fibers being permanently visible through non-destructive evaluation.

A composite assembly comprising a set of stacked composite plies, with each composite ply of the set of stacked composite plies being made from a plurality of fibers having a first subset of fibers being non-visible through non-destructive evaluation and a second subset of fibers being permanently visible through non-destructive evaluation.

A method of forming a composite assembly, the method comprising providing a set of stacked plies, with each ply of the set of stacked plies having a plurality of fibers being formed by providing a first subset of fibers being non-visible through non-destructive evaluation, and providing a second subset of fibers being permanently visible through non-destructive evaluation.

The turbine engine of any preceding clause, wherein the second subset of fibers include a differing conductivity or density with respect to the first subset of fibers.

The turbine engine of any preceding clause, wherein the second subset of fibers includes the differing conductivity visible through magnetic resonance imaging.

The turbine engine of any preceding clause, wherein the second subset of fibers includes the differing density visible through computed tomography imaging, X-Ray, ultrasound or acoustic imaging.

The turbine engine of any preceding clause, wherein the second subset of fibers makes up greater than 0% and less than or equal to 5% of a total number of fibers of the plurality of fibers.

The turbine engine of any preceding clause, wherein greater than 0% and less than or equal to 5% of the second subset of fibers are visible through non-destructive evaluation while a remaining portion of the fibers of the second subset of fibers are non-visible through non-destructive evaluation.

The turbine engine of any preceding clause, wherein the first subset of fibers and the second subset of fibers are the same material.

The turbine engine of any preceding clause, wherein the second subset of fibers includes a non-dissipating dopant.

The turbine engine of any preceding clause, wherein the non-dissipating dopant is an oxide dopant.

The turbine engine of any preceding clause, wherein the set of stacked composite plies includes a composite material including at least one of a polymer matrix composite, a ceramic matrix composite, a metal matrix composite, carbon fibers, a polymeric resin, a thermoplastic, a bismaleimide, a polyimide, an epoxy resin, glass fibers, or a silicon matrix.

The turbine engine of any preceding clause, wherein the composite assembly is an airfoil.

The turbine engine of any preceding clause, wherein the first and second subsets of fibers are non-visible or permanently visible, respectively, by one of magnetic resonance imaging, an X-Ray, computed tomography imaging, or acoustic imaging.

The turbine engine of any preceding clause, wherein a first 3D image of the composite assembly is created through use of non-destructive evaluation during or directly after manufacture of the composite assembly and saved for future comparison with a second 3D image of the composite assembly created through non-destructive evaluation after use of the composite assembly within the turbine engine.

The composite assembly of any preceding clause, wherein the second subset of fibers makes up greater than 0% and less than or equal to 5% of the plurality of fibers.

The composite assembly of any preceding clause, wherein greater than 0% and less than or equal to 5% of the second subset of fibers are visible through non-destructive evaluation while a remaining portion of the fibers of the second subset of fibers are non-visible through non-destructive evaluation.

The composite assembly of any preceding clause, wherein the second subset of fibers include a differing conductivity or density with respect to the first subset of fibers.

The composite assembly of any preceding clause, wherein the first and second subsets of fibers are non-visible or permanently visible, respectively, by one of magnetic resonance imaging, an X-Ray, computed tomography imaging, or acoustic imaging.

The composite assembly of any preceding clause, wherein the set of stacked composite plies includes a composite material including at least one of a polymer matrix composite, a ceramic matrix composite, a metal matrix composite, carbon fibers, a polymeric resin, a thermoplastic, a bismaleimide, a polyimide, an epoxy resin, glass fibers, or a silicon matrix.

The method of any preceding clause, further comprising generating a first 3D image of the composite assembly through use of non-destructive evaluation during or directly after manufacture of the composite assembly, comparing the first 3D image with a second 3D image of the composite assembly, the second 3D image being created through non-destructive evaluation after use of the composite assembly within the turbine engine.

The method of any preceding clause, further comprising forming the second set of fibers with a differing conductivity or density with respect to the first set of fibers.

The method of any preceding clause, further comprising forming the second subset of fibers with a differing conductivity visible through magnetic resonance imaging.

The method of any preceding clause, further comprising forming the second subset of fibers with a differing density through computed tomography imaging, X-Ray, ultrasound, or acoustic imaging.

The method of any preceding clause, further comprising providing the second subset of fibers such that the second subset of fibers make up greater than 0% and less than or equal to 5% of a total number of fibers of the plurality of fibers.

The method of any preceding clause, further comprising providing the second subset of fibers such that greater than 0% and less than or equal to 5% of the second subset of fibers are visible through non-destructive evaluation while a remaining portion of the fibers of the second subset of fibers are non-visible through non-destructive evaluation.

The method of any preceding clause, further comprising the first subset of fibers and the second subset of fibers with the same material.

The method of any preceding clause, further comprising forming the second set of fibers with a non-dissipating dopant.

The method of any preceding clause, further comprising forming the second set of fibers with a non-dissipating dopant including an oxide dopant.

The method of any preceding clause, further comprising providing the set of stacked composite plies with a composite material including at least one of a polymer matrix composite, a ceramic matrix composite, a metal matrix composite, carbon fibers, a polymeric resin, a thermoplastic, a bismaleimide, a polyimide, an epoxy resin, glass fibers, or a silicon matrix.

The method of any preceding clause, further comprising providing the composite assembly within an airfoil.

The method of any preceding clause, further comprising providing the composite assembly within on of a fan section, a compressor section, a turbine section or a combustion section of a turbine engine.

The method of any preceding clause, further providing the first subset of fibers and the second subset of fibers such that they are non-visible or permanently visible, respectively, by one of magnetic resonance imaging, an X-Ray, computed tomography imaging, or acoustic imaging.

What is claimed is:

1. A turbine engine comprising:
    a fan section, a compressor section, a combustion section, and a turbine section in serial flow arrangement; and
    a composite assembly provided within at least one of the fan section, the compressor section, the combustion section or the turbine section, the composite assembly having a set of stacked composite plies, each composite ply of the set of stacked composite plies having a thickness measured between opposing sides of each composite ply, the opposing sides being defined as portions of each composite ply that confront adjacent composite plies of the set of stacked composite plies, with at least one composite ply of the set of stacked composite plies comprising a plurality of fibers having:
        a first subset of fibers, each fiber of the first subset of fibers formed by a first material having a first material density and a first material conductivity, at least one of the first material density or the first material conductivity of the first material causing the first subset of fibers to be non-permanently visible through non-destructive evaluation; and
        a second subset of fibers, with at least a portion of the second subset of fibers being formed by a second material having a second material density or a second material conductivity larger than the first material density and the first material conductivity, respectively, at least one of the second material density or the second material conductivity of the second material causing at least the portion of the second subset of fibers to be permanently visible through non-destructive evaluation, the second subset of fibers being interspersed with the first subset of fibers when viewed along a plane extending along the at least one composite ply and being equidistant between the opposing sides of the at least one composite ply;

wherein the first material and the second material comprise a same material, and the second material of at least the portion of the second subset of fibers further comprises a non-dissipating dopant.

2. The turbine engine of claim 1, wherein the second material conductivity causes at least the portion of the second subset of fibers to be visible through magnetic resonance imaging.

3. The turbine engine of claim 1, wherein the second material density causes at least the portion of the second subset of fibers to be visible through computed tomography imaging, X-Ray, ultrasound or acoustic imaging.

4. The turbine engine of claim 1, wherein the second subset of fibers makes up greater than 0% and less than or equal to 5% of a total number of fibers of the plurality of fibers.

5. The turbine engine of claim 4, wherein greater than 0% and less than or equal to 5% of the second subset of fibers are visible through non-destructive evaluation while a remaining portion of the fibers of the second subset of fibers are non-permanently visible through non-destructive evaluation.

6. The turbine engine of claim 1, wherein the non-dissipating dopant is provided along at least a portion of the second subset of fibers.

7. The turbine engine of claim 6, wherein the non-dissipating dopant is an oxide dopant.

8. The turbine engine of claim 1, wherein the set of stacked composite plies includes a composite material including at least one of a polymer matrix composite, a ceramic matrix composite, a metal matrix composite, carbon fibers, a polymeric resin, a thermoplastic, a bismaleimide, a polyimide, an epoxy resin, glass fibers, or a silicon matrix.

9. The turbine engine of claim 1, wherein the composite assembly is an airfoil.

10. The turbine engine of claim 1, wherein the first subset of fibers and at least the portion of the second subset of fibers are non-permanently visible and permanently visible, respectively, by one of magnetic resonance imaging, an X-Ray, computed tomography imaging, or acoustic imaging.

11. The turbine engine of claim 1, wherein the at least one composite ply of the set of composite plies is a plurality of composite plies.

12. A composite assembly comprising:
a set of stacked composite plies, with each composite ply of the set of stacked composite plies having a thickness measured between opposing sides of each composite ply, the opposing sides being defined as portions of each composite ply that confront adjacent composite plies of the set of stacked composite plies, with at least one composite ply of the set of stacked composite plies being made from a plurality of fibers having:
a first subset of fibers, each fiber of the first subset of fibers formed by a first material having a first material density and a first material conductivity, at least one of the first material density or the first material conductivity of the first material causing the first subset of fibers to be non-permanently visible through non-destructive evaluation; and
a second subset of fibers, with at least a portion of the second subset of fibers being formed by a second material having a second material density or a second material conductivity larger than the first material density and the first material conductivity, respectively, at least one of the second material density or the second material conductivity of the second material causing at least the portion of the second subset of fibers to be permanently visible through non-destructive evaluation, the second subset of fibers being interspersed with the first subset of fibers when viewed along a plane extending along the at least one composite ply and being equidistant between the opposing sides of the at least one composite ply;
wherein the first material and the second material comprise a same material, and the second material of at least the portion of the second subset of fibers further comprises a non-dissipating dopant.

13. The composite assembly of claim 12, wherein the second subset of fibers makes up greater than 0% and less than or equal to 5% of the plurality of fibers.

14. The composite assembly of claim 12, wherein greater than 0% and less than or equal to 5% of the second subset of fibers are visible through non-destructive evaluation while a remaining portion of the fibers of the second subset of fibers are non-permanently visible through non-destructive evaluation.

15. The composite assembly of claim 12, wherein the first subset of fibers and at least the portion of the second subset of fibers are non-permanently visible and permanently visible, respectively, by one of magnetic resonance imaging, an X-Ray, computed tomography imaging, or acoustic imaging.

16. A method of forming a composite assembly, the method comprising:
providing a set of stacked plies, with each ply of the set of stacked plies having a thickness measured between opposing sides of each ply, the opposing sides being defined as portions of each ply that confront adjacent composite plies of the set of stacked plies, with at least one ply of the set of stacked plies having a plurality of fibers being formed by:
providing a first subset of fibers, each fiber of the first subset of fibers formed by a first material having a first material density and a first material conductivity, at least one of the first material density or the first material conductivity of the first material causing the first subset of fibers to be non-permanently visible through non-destructive evaluation; and
providing a second subset of fibers, with at least a portion of the second subset of fibers being formed by a second material having a second material density or a second material conductivity larger than the first material density and the first material conductivity, respectively, at least one of the second material density or the second material conductivity of the second material causing at least the portion of the second subset of fibers to be permanently visible through non-destructive evaluation, the second subset of fibers being interspersed with the first subset of fibers when viewed along a plane extending along the at least one ply and being equidistant between the opposing sides of the at least one ply;
wherein the first material and the second material comprise a same material, and the second material of at least the portion of the second subset of fibers further comprises a non-dissipating dopant.

17. The method of claim 16, providing the second subset of fibers such that the second subset of fibers make up greater than 0% and less than or equal to 5% of a total number of fibers of the plurality of fibers.

* * * * *